United States Patent
Wang

(10) Patent No.: US 6,329,468 B1
(45) Date of Patent: Dec. 11, 2001

(54) HOT MELT ADHESIVE BASED ON SEMICRYSTALLINE FLEXIBLE POLYOLEFINS

(75) Inventor: Baoyu Wang, Waukesha, WI (US)

(73) Assignee: Bostik Findley, Inc., Wauwatosa, WI (US)

( * ) Notice: Subject to any disclaimer, the term of this patent is extended or adjusted under 35 U.S.C. 154(b) by 0 days.

(21) Appl. No.: 09/489,117

(22) Filed: Jan. 21, 2000

(51) Int. Cl.$^7$ .............. C08L 23/00; C08L 91/06; C08K 5/01

(52) U.S. Cl. ............ 525/240; 156/334; 156/311; 156/327; 156/328; 156/358; 427/208.2; 427/385.5; 427/422; 442/150; 442/155; 442/327; 604/358; 604/365; 604/366; 524/474; 524/487; 524/499; 524/515; 524/518; 524/528; 524/529; 524/570; 524/582

(58) Field of Search .................. 156/334, 228, 156/311, 327, 358; 427/208.2, 385.5, 422; 442/327, 150, 155; 604/358, 365, 366; 524/499, 515, 518, 528, 529, 570, 582, 474, 487; 525/240

(56) References Cited

U.S. PATENT DOCUMENTS

| | | | |
|---|---|---|---|
| 3,868,433 | 2/1975 | Bartz et al. | 156/334 |
| 4,022,728 | 5/1977 | Trotter et al. | 524/274 |
| 4,072,735 | 2/1978 | Ardemagni | 524/274 |
| 4,120,916 | 10/1978 | Meyer, Jr. et al. | 529/240 |
| 4,284,541 | 8/1981 | Takeda et al. | 524/272 |
| 4,761,450 | 8/1988 | Lakshmanan et al. | 524/488 |
| 4,788,245 | 11/1988 | Anderson | 524/518 |
| 4,803,035 | 2/1989 | Kresge et al. | 264/519 |
| 5,010,119 | 4/1991 | McElrath, Jr. et al. | 523/205 |
| 5,185,398 | 2/1993 | Kehr et al. | 525/74 |
| 5,281,651 | 1/1994 | Arjunan et al. | 524/519 |
| 5,391,617 | 2/1995 | Olivier et al. | 525/72 |
| 5,612,141 | 3/1997 | Davis et al. | 428/515 |
| 5,723,546 * | 3/1998 | Sustic | 525/240 |
| 5,747,573 | 5/1998 | Ryan | 524/270 |
| 5,798,175 | 8/1998 | Tynan, Jr. et al. | 428/355 |

FOREIGN PATENT DOCUMENTS

| | | |
|---|---|---|
| 0672737 | 9/1995 | (EP). |
| 0714963 | 6/1996 | (EP). |
| 0758675 | 2/1997 | (EP). |

OTHER PUBLICATIONS

Montell Polyolefins Data Sheet, Adflex KS–357P, Montell North America, Inc., Oct. 1996.

Montell Polyolefins Data Sheet, Adflex KS–084P, Montell North America, Inc., Jan., 1997.

Keltan Survey of EPDM grades, DSM Copolymer, Inc., Nov., 1996.

Keltan 1446 Ultra–low viscosity EPDM, DSM Copolymer, Inc., Aug., 1995.

* cited by examiner

Primary Examiner—Peter Szekely
(74) Attorney, Agent, or Firm—Andrus, Sceales, Starke & Sawall, LLP

(57) ABSTRACT

A flexible polyolefin-based hot melt adhesive composition having a variety of end uses, particularly in bonding polyethylene and polypropylene films, nonwoven fabrics and elastic attachment applications in nonwoven disposable articles. The composition includes a flexible polyolefin polymer or a blend of flexible polyolefin polymers, a tackifier resin, a plasticizer, and optionally a wax and a stabilizer. The preferred flexible polyolefin polymer has a melt flow rate greater than 5 g/10 min. and a density between 0.86 to 0.90 g/cm$^3$. The hot melt adhesive composition provides a novel combination of desirable properties including good adhesion to a variety of substrates, low viscosity, good heat stability and oil resistance. The adhesive can be applied using common application techniques such as extruding or spraying.

21 Claims, 3 Drawing Sheets

HOT MELT ADHESIVE BASED ON SEMICRYSTALLINE FLEXIBLE POLYOLEFINS

FIELD OF INVENTION

This invention relates to novel sprayable hot melt adhesive compositions based on plasticized and tackified flexible polyolefins (FPO). More particularly, this invention relates to adhesive compositions which find utility in manufacturing nonwoven disposable articles such as diapers and feminine care products. The adhesive compositions of the present invention are particularly useful in elastic attachment applications where oil resistance is desired.

BACKGROUND OF THE INVENTION

Hot melt adhesives typically exist as solid masses at ambient temperature and can be converted to a flowable liquid by the application of heat. These adhesives are particularly useful in manufacturing of a variety of disposable goods where bonding of various substrates is often necessary. Specific applications include disposable diapers, hospital pads, sanitary napkins, pantyshields, surgical drapes and adult incontinent briefs, collectively known as disposable nonwoven products. Other diversified applications have involved paper products, packaging materials, tapes and labels. In these applications, the hot melt adhesive is heated to its molten state and then applied to a substrate. A second substrate is then immediately brought into contact with and compressed against the first. The adhesive solidifies on cooling to form a strong bond. The major advantage of hot melt adhesive is the lack of a liquid carrier, as would be the case of water or solvent based adhesives, thereby eliminating costly processes associated with liquid carrier removal.

For many applications, hot melt adhesives are often extruded directly onto a substrate in the form of a thin film through a slot die by using piston or gear pump equipment. In these cases, the substrate is brought into intimate contact with a hot die under pressure. The temperature of the die must be maintained well above the melting point of the adhesive, typically in the range of 150 to 200° C. For some applications, particularly for manufacturing nonwoven articles, bonding of delicate and heat sensitive substrates, such as thin gauge polyethylene film, is often involved. Direct contact between the substrate and the die, in these cases, must be avoided to prevent the substrate from burning or distorting. Several application methods have been developed through which a hot melt adhesive can be spray coated with the aid of compressed air onto the substrate from a distance. These indirect techniques include spiral spray, and various forms of melt-blown methods. Direct contact between the coating head and the substrate is thus eliminated. All the coating techniques mentioned above are well known to those skilled in the art and commercial equipment is readily available.

The indirect coating techniques, however, pose stringent requirements on hot melt adhesives. The viscosity of the adhesive must be sufficiently low, usually in the range of 2,000 to 30,000 cP, preferably in the range of 2,000 to 15,000 cP, at the application temperature. Many other physical factors, especially the rheological properties of the adhesive, come into play in determining the sprayability of a hot melt adhesive. The majority of commercial hot melt products do not lend themselves to spray applications. There are no widely accepted theoretical models or guidelines to predict sprayability and it must be determined empirically with application equipment.

In accordance with the present invention, it has been found that a blend comprising a flexible polyolefin (FPO), a tackifying resin, a plasticizer and, optionally, a synthetic polyolefin wax or petroleum wax provides a sprayable hot melt adhesive which has novel combinations of properties including good adhesion to a variety of substrates, low viscosity, good heat stability and oil/ointment resistance. The composition of the present invention is particularly useful in manufacturing nonwoven articles for binding of polyethylene and polypropylene films, nonwoven fabrics and elastic bands to each other or to themselves.

The flexible polyolefin polymers useful in this invention are essentially high molecular weight propylene homopolymers or copolymers of propylene with other a-olefin monomers such as ethylene, butene-1 or hexene-1. FPOs should not be confused with the conventional crystalline polypropylene and amorphous poly-α-olefins (APAO). It is well know to those skilled in the art that the conventional crystalline polypropylene are high molecular weight polymers of propylene with a predominantly isotactic chain structure. The isotactic configuration can be described as having the methyl groups attached to the tertiary carbon atoms of successive monomeric units on the same side of a hypothetical plane through the main chain of the polymer. This type of stereochemical chain structure can be illustrated graphically by using the Fischer projection formula as follows:

Due to its high degree of chain regularity, the conventional isotactic polypropylene (IPP) is highly crystalline with crystallinity usually greater than 50% and a heat of fusion, which is a measure of crystallinity, greater than 70 J/g. The conventional crystalline polypropylenes are usually stiff materials having high density and a high melting point. They have not been used as the sole polymer base for hot melt adhesive applications. Typical conventional IPP usually has a melt flow rate, which is inversely related to average molecular weight, in the range of 0.5–200 g/10 min. as measured in accordance with ASTM D-1238 method.

APAOs, on the other hand, are a family of essentially amorphous low molecular weight homopolymers of propylene or copolymers of propylene with ethylene, butene-1 or hexene-1. In contrast to the regular isotactic structure, APAOs are atactic with the methyl groups on the successive monomeric units sterically randomly distributed on the opposite sides of the hypothetical plane through the polymer chain. The stereo configuration of atactic APAO can be depicted by using the Fischer projection formula as follows:

The irregular stereo configuration hinders the formation of any ordered three-dimensional array and as a result, amorphous poly-α-olefins, as the name indicates, are essentially noncrystalline, or amorphous soft materials having low mechanical strength and low density. Compared with crystalline polypropylene, APAOs are usually low average molecular weight polymers having a melt flow rate of around 2000 g/10 min. as measured in accordance with ASTM-D-1238.

Flexible polyolefins (FPO) is another unique family of propylene-based polymers. In contrary to the predominantly isotactic chain configuration of IPP and predominantly atactic chain configuration of APAO, the stereostructure of FPO can be described as having segments or blocks of regular isotactic structure that are interspersed by segments or blocks of atactic structure. Due to this unique molecular chain architecture, FPOs are semi-crystalline with crystallinity and melting point below those of IPP. The unique molecular structure of FPO leads to an unusual and desirable combination of physical and mechanical properties such as low density, low melting point, flexibility, softness and elasticity.

In addition to the difference in molecular structure, FPOs are also readily distinguishable from IPPs and APAOs by their unique physical properties. Typical FPOs will have a melting point between 250–320° F. and a heat of fusion in the range of 15 to 60 J/g, whereas crystalline IPPs usually have a melting point about 340° F. and a heat of fusion above 70 J/g. APAOs, on the other hand, are usually predominantly amorphous without a well-defined melting point although some commercial APAO products may exhibit very low degree of crystallinity with a heat of fusion less than 10 J/g. Other profound differences between FPO, IPP and APAO lies in their densities. The density of FPO is typically between 0.87 to 0.90 g/cm$^3$, which is in between those of IPP and APAO. IPPs have the highest density ranging from 0.90 to 0.95 g/cm$^3$ and APAOs, the lowest ranging from 0.85 to 0.87 g/cm$^2$. The differences in physical properties among those three unique families of polyolefins are well known and have been the subject of many articles.

Due to their high melting point, high degrees of crystallinity and the lack of desirable physical and mechanical attributes such as flexibility, elasticity and softness, the conventional IPPs have not been used alone as the polymer base for hot melt adhesive applications. A hot melt adhesive based on IPP would be too brittle to yield acceptable bond strength and yet would require high application temperature well beyond the melting point of 340° F. for IPP.

Hot melt adhesives containing APAO, on the other hand, are known in the art. These adhesives typically have greater than 50% by weight of the polymer. It is well known that adhesives based on APAOs generally have poor cohesive strength, poor heat resistance, low elevated temperature peel and low shear values. APAOs have not found much use in disposable nonwoven applications where a combination of high bond strength at very low coating weight and easy processability by spray techniques mentioned above is required. APAO based adhesives usually lack such capability.

For example, Ryan discloses in U.S. Pat. No. 5,747,573 an APAO based hot melt adhesive composition useful for bonding plastics and metallized foil containers. The adhesive composition contains a blend of APAO, a solid benzoate plasticizer and a hydrocarbon tackifier.

Trotter et al, U.S. Pat. No. 4,022,728 describes a hot melt pressure sensitive composition comprising a blend of APAOs, a low molecular weight substantially amorphous elastomer, a liquid tackifier and a crystalline polypropylene (IPP) in an amount up to 2% by weight. It is claimed that the composition provides good adhesive properties at low temperatures.

Kehr et al, U.S. Pat. No. 5,185,398, discloses an adhesive coating composition comprising 90–99.9 parts by weight of an olefin-carboxylic acid/acid derivative polymer carrying functional groups. The composition is claimed to have major improvement in adhesion to polyolefin plastics and metals over adhesives based on APAO and tackifier blends.

Meyer et al, U.S. Pat. No. 4,120,916, discloses hot melt adhesive compositions comprising a blend of polyethylene, APAO and crystalline propylene containing polymer. These hot melt compositions are said to have a novel combination of properties such as short hot tack times and open times for the bonding of paraffin modified corrugated board.

Lakshmanan et al, U.S. Pat. No. 4,761,450, disclose a compatible polymer blend useful as hot melt adhesive comprising a low density ethylene polymer, a copolymer of butene-1 with ethylene or propylene, a hydrocarbon tackifier and a low molecular weight polymer selected from the group consisting of a low molecular weight liquid polybutene, an amorphous polypropylene and mixtures thereof.

It is apparent that all the above prior art adhesive compositions are based on the APAO family. As noted above, APAOs differ significantly from FPOs used in the present invention in both molecular structure, average molecular weight, physical and mechanical properties. These prior art APAO adhesives are formulated for applications other than for disposable nonwovens products and usually lack sprayability.

In the construction of disposable nonwoven articles such as diapers, hot melt adhesives based on styrenic block copolymers such as styrene-isoprene-styrene (SIS) block copolymers or styrene-butadiene- styrene (SBS) block copolymers are widely used to bond polyethylene film, or the like, to tissue or nonwoven substrates. The block copolymer based adhesives are particularly useful in the construction of inner leg gather or cuff which is employed to prevent leakage of bodily waste from around the user's legs. During use, this cuff or flap is held in place with one or more elastic bands surrounding the leg. These elastic bands are typically held in place and attached to the disposable article by hot melt adhesive.

These block copolymer adhesives, however, possess shortcomings such as viscosity instability which manifests itself at elevated temperature. Another shortcoming is that these block copolymers lose most of their bond strength upon exposure to mineral oil or other oil based ointments. Mineral oil and other oil based ointments are often used on infants to treat skin rashes, and thus prior hot melt adhesive compositions, upon exposure thereto, experience adhesive bond failure. As a result, the elastic leg bands may actually let loose from the diaper resulting to complete failure and break down of the inner leg cuff. Therefore, an adhesive that is capable of withstanding exposure to mineral oil or other oil based ointments while still providing sufficient bond strength for elastic band attachment in the inner leg cuff would be highly desirable.

SUMMARY OF THE INVENTION

The present invention is directed to a hot melt adhesive composition based on at least one semicrystalline FPO polymer. The adhesive comprises a blend of a flexible polyolefin (FPO), a tackifying resin, a plasticizer, and optionally a synthetic polyolefin wax or petroleum wax as the primary ingredients. The compositions of the present invention have overcome the shortcomings of the prior art APAO and block copolymer based adhesives and provide excellent heat stability, improved cohesive strength, low viscosity, and good adhesion to a variety of substrates and good processibility with conventional coating equipment. In particular, the present invention provides an adhesive composition which is suitable for a variety of spray coating application techniques.

The hot melt adhesive composition of the present invention possess certain physical properties that makes it ideally suited for use with nonwoven disposable articles. More particularly, the hot melt adhesive of the present invention has excellent oil/ointment resistance, and thus maintains acceptable bond strength even after saturating exposure to mineral oil.

The hot melt adhesive composition of this invention are particularly useful for elastic attachment applications in disposable nonwoven articles such as diapers to bond various elastic materials to porous and nonporous substrates such as nonwoven materials, polyethylene films, polypropylene films, and the like to one another. The hot melt adhesive composition provides good elastic attachment bonds when tested via standard creep resistance test methods.

The hot melt composition of this invention also provides excellent construction bonds when tested via standard peel strength tests. In addition, when formulated for use with polyolefin films the hot melt adhesive maintains excellent dry bond strength even after exposure to elevated temperature aging, i.e. simulated warehouse conditions.

The hot melt adhesive composition of the present invention comprises as components thereof a mixture of the following ingredients:

a. A flexible polyolefin (FPO) or a blend of FPOs having a melt flow rate equal to or greater than 5 g/10 min. and a density ranging from 0.86 to 0.90 g/cm$^3$, preferably in the range of 10–40% by weight;

b. A compatible tackifier, preferably in the amount of 30% to 70% by weight;

C. A plasticizer, preferably in the amount of 5% to 30% by weight;

d. About 0% to 30% by weight of a wax; and e. About 0 to 2% by weight of a stabilizer or antioxidant.

the components of the composition adding up to 100% by weight. The adhesive composition may contain other ingredients such as a filler which can modify the adhesive properties of the above basic adhesive composition.

In another aspect of the present invention, there is provided a method for bonding a first substrate to a second substrate in the manufacture of disposable nonwoven absorbent articles. In this method, first and second substrates to be bonded together are fed toward a laminating station, a flexible polyolefin-based adhesive in accordance with the present invention is applied to the surface of at least one of the substrates prior to reaching the laminating station, so that when combined and subjected to pressure, the two substrates are bonded together.

DETAILED DESCRIPTION OF THE INVENTION

Figure 1:
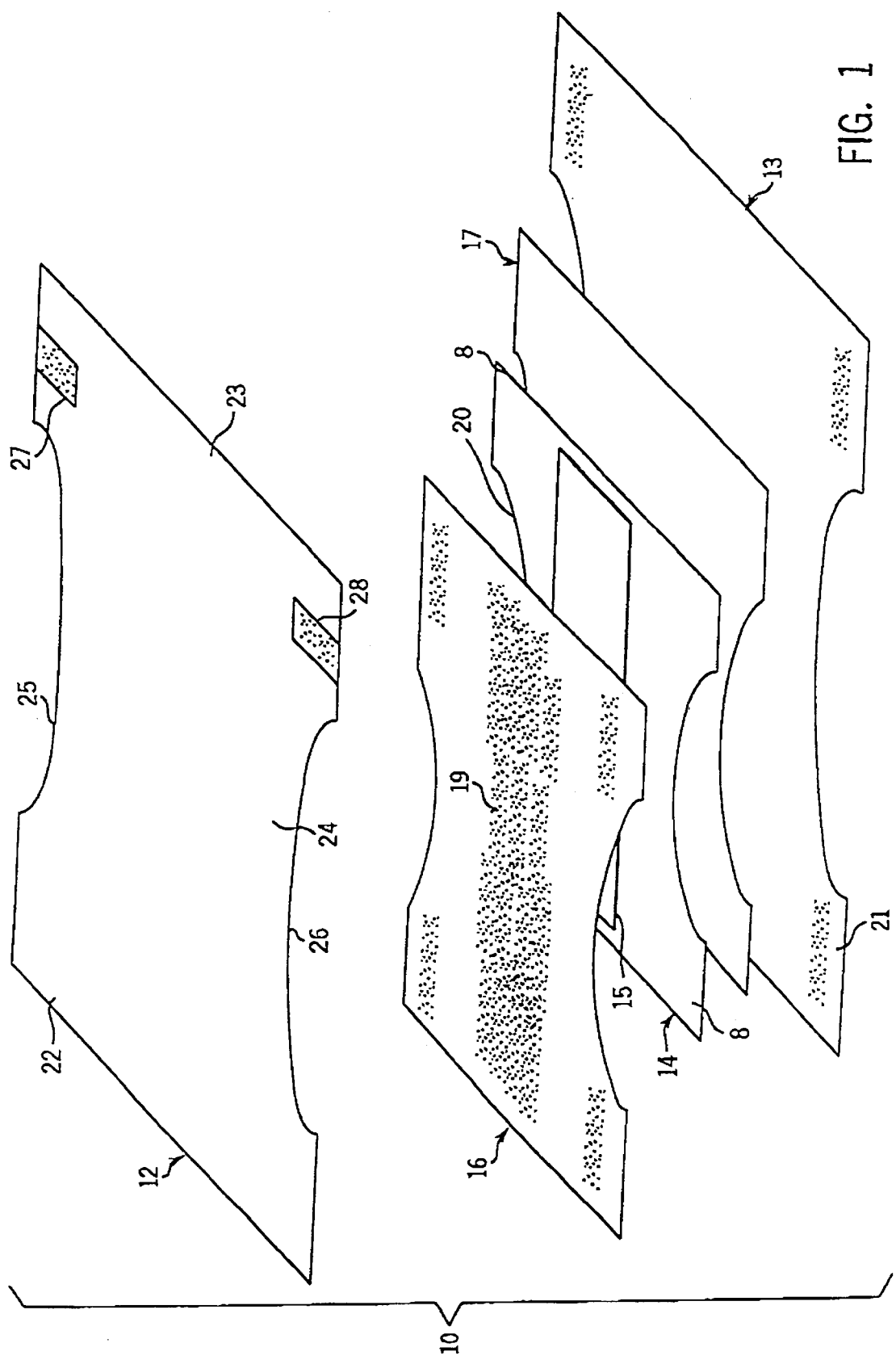
FIG. 1 is a schematic, exploded, perspective view of a disposable diaper incorporating a hot melt adhesive constructed in accordance with the present invention.

In accordance with the present invention, a hot melt adhesive composition is produced, comprising as the primary polymer component about 10% to 40% by weight of a semicrystalline FPO polymer, or a mixture of semicrystalline FPO polymers. The hot melt adhesive composition of the present invention also includes 30% to 70% by weight of tackifying resin, about 5% to 30% by weight of plasticizer, about 0% to 30% by weight of wax and about 0% to 2% by weight of stabilizer or antioxidant. Optionally, the composition also contains up to 50% by weight of a filler.

The hot melt adhesive composition of the present invention includes a flexible polyolefin (FPO) polymer. Suitable FPO polymers can be obtained either by homopolymerization of propylene or by copolymerization of propylene with other unsaturated olefin monomers containing 2 to 10 carbon atoms, which include, but are not limited to, ethylene, butene-1, pentene-1, 4-methyl pentene-1, hexene-1, and octene-1.

The preferred FPO polymers are homopolymers of the propylene type and copolymers of propylene and ethylene having ethylene comonomer content ranging from 5% to 20% by weight. FPO polymers having a melt flow rate equal to or greater than 5 g/10 min. and a density between 0.86 to 0.90 g/cm$^3$ can be used in the composition of the present invention, but those having a melt flow rate between 20 g/10 min. and 200 g/10 min. and a density around 0.88 g/cm$^3$ are the most preferred. The FPO polymers of the type described above are commercially available from Huntsman Corporation under the trade name designation RexFlex.

The tackifying resins which are used in the hot melt adhesives of the present invention are those which extend adhesive properties and improve specific adhesion. As used herein, the term "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28-58T, of from about 10° C. to 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(d) copolymers and terpolymers of natural terpenes, e.g. styrene/terpene, α-methyl styrene/terpene and vinyl toluene/terpene;

(e) phenolic-modified terpene resins such as, for example, the resin product resulting from the condensation, in an acidic medium, of a terpene and a phenol;

(f) aliphatic and cycloaliphatic petroleum hydrocarbon resins having Ring and Ball softening points of from about 10° C. to 140° C., the latter resins resulting from the polymerization of monomers consisting primarily of aliphatic or cycloaliphatic olefins and diolefins; also included are the hydrogenated aliphatic and cycloaliphatic petroleum hydrocarbon resins; examples of such commercially available resins based on a $C_5$-olefin fraction of this type are Piccotac 95 tackifying resins sold by Hercules Corp. and Eastotac H115R sold by Eastman Chemical Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. Although a range of 30% to 70% by weight tackifying resin may be used, the preferred range is 35% to 60%. Tackifying resins which are useful for the present invention can perhaps include polar tackifying resins, however, the choice of available polar tackifying resins is limited in view of the fact that many of the polar resins appear only partially compatible with the FPO polymers.

As noted above, tackifying resins which are useful within the scope of the present invention comprise about 30% to about 70% by weight. Preferably, the tackifying resins can be selected from any of the nonpolar types, which are commercially available. Preferred resins are aliphatic petroleum hydrocarbon resins examples of which are based on a C5 olefin such as Piccotac 95 available from Hercules Corp. Most preferred are nonpolar tackifying resins which are completely hydrogenated $C_9$ or pure monomer-based hydrocarbon resins with softening points that are in a range of approximately 70° C. to approximately 125° C.

A plasticizer can be present in the composition of the present invention in amounts of about 5% to about 30%, by weight, preferably from about 10% to about 25%, in order to provide desired viscosity control. A suitable plasticizer may be selected from the group which includes the usual plasticizing oils, such as mineral oil, but also olefin oligomers and low molecular weight polymers, as well as vegetable and animal oil and derivatives of such oils. The petroleum derived oils which may be employed are relatively high boiling temperature materials containing only a minor proportion of aromatic hydrocarbons. In this regard, the aromatic hydrocarbons should preferably be less than 30%, and more particularly less than 15%, by weight, of the oil. Preferably, the oil may be totally non-aromatic. The oligomers may be polypropylenes, polybutenes, hydrogenated polyisoprene, hydrogenated butadiene, or the like having average molecular weights between about 350 and about 10,000. Suitable vegetable and animal oils include glycerol esters of the usual fatty acids and polymerization products thereof. The plasticizer that finds usefulness in the present invention can be any number of different plasticizers but the inventors have discovered that a plasticizer which includes mineral oil is particularly useful in the present invention. Other liquid polybutenes having average molecular weights less than 5,000 may also be used. As will be appreciated, plasticizers have typically been employed to lower the viscosity of the overall adhesive composition without substantially decreasing the adhesive strength and/or the service temperature of the adhesive as well as extend the open time of the adhesive.

The waxes which can be used in amounts varying from 0% to 30% by weight, preferably from 5% to 15%, in the composition of the present invention are used to reduce the melt viscosity of the hot melt adhesives. These waxes reduce the open time of the composition without effecting the temperature performance. Among the useful waxes are:

(1) low molecular weight, that is, 500–6000, polyethylene having a hardness value, as determined by ASTM method D-1321, of from about 0.1 to 120 and ASTM softening points of from about 65° C. to 120° C.;

(2) petroleum waxes such as paraffin wax having a melting point of from about 50° C. to 80° C. and microcrystalline wax having a melting point of from about 55° C. to 95° C., the latter melting points being determined by ASTM method D127-60;

(3) synthetic waxes made by polymerizing carbon monoxide and hydrogen such as Fischer-Tropsch wax; and (4) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred for use in the compositions of the present invention have a Ring and Ball softening point of 100° C. to 170° C. As should be understood, each of these wax diluents is solid at room temperature. Other useful substances include hydrogenated animal, fish and vegetable fats and oils such as hydrogenated tallow, lard, soya oil, cottonseed oil, castor oil, menhadin oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

The present invention may include a stabilizer in an amount of from about 0% to about 2% by weight. Preferably from about 0.1% to 1% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. Among the applicable stabilizers are high molecular weight hindered phenols and multifunctional phenols, such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5,-trimethyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-di-tert-butyl-4-hydroxyphenyl) propionate;

4,4'-methylenebis(4-methyl-6-tert butylphenol);

4,4'-thiobis(6-tert-butyl-o-cresol);

2, 6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy) -1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-3(3,5-di-tert-butyl-4-hydroxy-phenyl) propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

It should be understood that other optional additives may be incorporated into the adhesive composition of the present invention in order to modify particular physical properties. These may include, for example, such materials as colorants e.g. titanium dioxide, fillers, fluorescent agents, surfactants, etc. Typical fillers include talc, calcium carbonate, clay, silica, mica, wollastonite, feldspar, aluminum silicate, alumina, hydrated alumina, glass microspheres, ceramic microspheres, thermoplastic microspheres, baryte and wood flour.

The invention is further illustrated by way of the examples which are set forth below.

The hot melt adhesive composition of the present invention may be formulated using any of the techniques known in the art. A representative example of the prior art mixing procedure involves placing all the components, except the FPO polymer, in a jacketed mixing kettle equipped with a rotor, and thereafter raising the temperature of the mixture to a range from 330° F. to 400° F. to melt the contents. It should be understood that the precise temperature to be used in this step would depend on the melting points of the particular ingredients. The FPO polymers are subsequently introduced to the kettle under agitation and the mixing is allowed to continue until a consistent and uniform mixture is formed. The contents of the kettle is protected with inert gas such as carbon dioxide and nitrogen during the entire mixing process.

The resulting hot melt adhesives may then be applied to substrates using a variety of coating techniques. Examples include hot melt slot die coating, hot melt wheel coating, hot melt roller coating, melt blown coating and spiral spray coating. In a preferred embodiment, the hot melt adhesive is sprayed onto a substrate using spiral spray technique, which is a preferred technique to produce a filamentary spiral pattern for diaper construction and elastic attachment. In one example, the coater is equipped with a disc-like coating die which has a nozzle tip in the center. The tip is surrounded with a series of inclined orifices for hot air jets to pass through. The hot melt adhesive is pumped out of the nozzle in the form of a small filament. The filament is then rotated by high-velocity hot air jets coming out of the orifices, thereby producing a helical pattern from a single strand of adhesive. It is not the intent of this invention to provide a full description of spiral spray technique and the details can be found in the literature.

The adhesive composition of the present invention may be used in a number of applications such as, for example, in disposable nonwoven goods, paper converting, flexible packaging, carton sealing, labeling and other assembly applications. Particularly preferred applications include disposable diaper and feminine sanitary napkin construction, diaper elastic attachment, diaper and feminine napkin core stabilization, diaper backsheet lamination, industrial filter material lamination, surgical gown and surgical drape assembly.

TESTS AND MATERIALS

Viscosity was tested according to ASTM D-3236 Method at 350° F.

Ring & Ball softening point was determined with an automated Herzog unit according to ASTM E-28.

Peel strength was measured in 180° geometry with a Tensile Tester (Instron Model 55R1122) in the controlled atmospheric environment (77° F., 50% relative humidity). Prior to the test, the specimens were equilibrated at the controlled environment for approximately 12 hours to ensure the reproducibility and the accuracy of the data. The test was done with 0.5" wide spiral spray coated specimens at a cross-head speed of 12"/min. The average peel value of six specimens, normalized to g/in unit, was reported as the peel strength.

Creep Resistance test was carried out with laminated specimens described in Examples 1–7. The specimen, cut to 300 mm in length, was stretched out completely and its ends were securely attached to a piece of rigid corrugated paperboard. A length of 200 mm was marked and the elastic strands were cut at the marks. The specimen was then placed in an air-circulating oven at 100° F. Under these conditions, the elastic strands under stress can retreat to a certain distance. The distance between the ends was measured with a ruler after an hour. The ratio of the final length to the initial length, expressed in percentage (%), is defined as the Creep Resistance or Creep Retention.

Sprayability was measured empirically on a Meltex CT225 (Nordson) hot melt coater. The coating conditions varied depending on the adhesive sample.

RexFlex W218 is a copolymer FPO consisting of about 10% by weight of ethylene and about 90% by weight of propylene monomer units. It has a density of about 0.88 g/cm$^3$ measured in accordance with ASTM D-1505 and a melt flow rate of about 35 g/10 min. as measured in accordance with ASTM D-1238 method.

RexFlex W219 is a copolymer FPO consisting of about 18% by weight of ethylene and 82% by weight of propylene monomer units. It has a density of about 0.88 g/cm$^3$ (ASTM D-1505) and a melt flow rate of about 100 g/10 min. (ASTM D-1238).

RexFlex W121 is a homopolymer FPO consisting of propylene monomer units. It has a density of about 0.88 g/cm$^3$ (ASTM D-1505) and a melt flow rate of about 150 g/10 min. (ASTM D-1238).

Escorez 5400, purchased from Exxon, is a very light color, hydrogenated cycloaliphatic hydrocarbon tackifier having an R&B softening point of 100° C. and weight average molecular weight ($\overline{Mw}$) of about 520.

Eastotac H100W is a hydrogenated C5 aliphatic hydrocarbon resin having a R&B softening point of 100° C. It is purchased from Eastman Chemical Company.

Epolene N-15, available from Eastman Chemical Company, is a propylene derived synthetic wax having a R&B softening point of about 163° C. and a Brookfield viscosity of about 600 cP at 190° C.

Marcus 300, purchased from Marcus Oil & Chemicals, Inc., is a synthetic polyethylene wax having a melting point of about 240° F.

Pennznap 500, purchased from Pennzoil Products Co., is a mineral oil plasticizer.

EXAMPLES 1–8

Hot melt adhesives of Table I were prepared with the ingredients and mixing procedures described hereinabove. A total of 2000 grams were made each and the mixing was carried out at 375° F. under carbon dioxide atmosphere in a laboratory propeller type mixer which consists of a propeller powered by a motor, a heating mantle, a temperature control unit and a container of about 1 gallon in size. The appropriate amounts of each component calculated according the ratios shown in the table, except the polymers, were added to the container and the temperature of the container was then raised to melt the content. After the ingredients in the container were completely melted, the motor was turned on to start agitation. Subsequently, the polymer component was introduced. The mixing was continued until the polymer became completely dissolved and a uniform mixture was obtained. The Rexflex FPO polymer family was employed for preparing Examples of Table I. These polymers are available from Huntsman. The adhesives of Examples 1–8 are useful for a variety of packaging and disposable nonwoven product assembly applications.

Several tests were carried out on Examples 1–8 according to the procedures described above. Specimens for creep resistance and peel strength tests were prepared using Meltex CT225 hot melt coater by laminating three elastic strands (Lycra 740) stretched to 300% either between two layers of polypropylene nonwoven fabric (NW) of 20 g/m² basis weight or between a layer of 1.0 mil thick polyethylene film (PE) and a layer of polypropylene nonwoven described herein above. Sprayability was also evaluated in the process. Adhesives were spiral sprayed at 18.6 g/m² coating weight with a 0.25 seconds open time and 1 bar compression at the nip rolls. While the temperature was kept at 400° F. for the heated air used for spraying, the application temperature was adjusted for each adhesive to optimize the spiral pattern. The actual application temperature was shown in Table I for each adhesive.

H2494-01, which is available from Ato Findley, Inc. is used as the control. Specimens for the peel strength test were obtained using Meltex CT225 hot melt coater by laminating three elastic strands (Lycra 740) stretched to 300% between two layers of polypropylene nonwoven fabric of 20 g/m² basis weight. Adhesives were spiral sprayed at 18.6 g/m² coating weight with a 0.25 seconds open time and 1 bar compression at the nip rolls. The laminates were then cut to 1 inch wide strips in the cross machine direction. The strips were saturated with Johnson™ Baby Oil and allowed to stand at ambient temperature for 30 minutes. The strips were subsequently subjected to 100° F. temperature in an oven for 60 minutes. After equilibrated in the controlled atmosphere environment (77°F. and 50% relative humidity) for 5 minutes, the specimens were tested for peel strength by using Instron Model 55R1122 Tensile Tester in accordance with the procedure described hereinabove. The peel strength after the oil saturation is given in Table 2.

TABLE 2

PEEL STRENGTH AFTER OIL SATURATION

| Sample | Peel Strength (g/in) |
|---|---|
| H2494-01 | 0 |
| Example 1 | 86 |
| Example 2 | 99 |
| Example 3 | 62 |
| Example 4 | 76 |
| Example 5 | 136 |

As shown in Table 2, the comparative example of typical SIS-based hot melt adhesive has lost 100% of its bond

TABLE I

EXAMPLES 1–8

| Ingredients | Percent (%) by Weight | | | | | | | |
|---|---|---|---|---|---|---|---|---|
| | 1 | 2 | 3 | 4 | 5 | 6 | 7 | 8 |
| RexFlex W121 | 30.0 | — | — | — | — | — | — | — |
| RexFlex W218 | — | 24.0 | 20.0 | 20.0 | 20.0 | 16.0 | — | — |
| RexFlex W219 | — | — | — | — | — | — | 30.0 | 25.0 |
| Pennznap 500 | 10.0 | 20.0 | 17.0 | 20.0 | 18.0 | 15.0 | 18.0 | 15.0 |
| Marcus 300 | 15.0 | — | — | — | 15.0 | — | — | — |
| Epolene N-15 | — | — | — | — | — | 13.0 | — | 17.0 |
| Escorez 5400 | — | 55.0 | 62.0 | 59.0 | 46.0 | — | — | — |
| Eastotac H100W | 44.00 | — | — | — | — | 55.0 | 51.0 | 42.0 |
| Antioxidant | 1.0 | 1.0 | 1.0 | 1.0 | 1.0 | 1.0 | 1.0 | 1.0 |
| R&B (° F.) | 293 | 261 | 255 | 255 | 258 | 295 | 218 | 301 |
| Viscosity (cP), 350° F. | 2470 | 10900 | 6880 | 6200 | 5330 | 3880 | 4140 | 3200 |
| Application Temp. (° F.) | 365 | 365 | 365 | 350 | 365 | 365 | 350 | 350 |
| Sprayability | Exc | Exc | Exc | Exc | Exc | Exc | Exc | Exc |
| Peel. Str. (g/in) | | | | | | | | |
| PE/NW | 671* | 889* | 457 | 747* | 764* | 166 | 459 | 425 |
| NW/NW | 878* | 519 | 901* | 872* | 856* | 973* | 717* | 754* |
| Creep Retention (%) | | | | | | | | |
| PE/Lycra/NW | 92 | 73 | 85 | 76 | 80 | 84 | n.t** | n.t** |
| NW/Lycra/NW | 84 | 88 | 89 | 83 | 77 | 89 | n.t** | n.t** |

*Substrate failure
**n.t. - not tested

EXAMPLE 9

The oil and oil-based ointment resistant characteristics of the composition of the present invention is illustrated in this example. To measure the oil resistance property quantitatively, the adhesive compositions of Examples 1–5 were prepared by using the same procedure described hereinabove. For comparison, a commercial SIS based product strength after being exposed to oil treatment, whereas the examples of hot melt composition of the present invention still retain fairly good bond strength.

As used herein, the term "diaper" refers to an absorbent article typically worn by infants, young children and incontinent adult persons. As readily understood such an absorbent article is worn about the lower torso of the wearer and is held in place about the wearer's hips. It should be understood, however, that the present invention is also applicable to other absorbent articles such as training pants, incontinent products such as briefs and undergarments, feminine care products such as sanitary napkins and pantyliners, medical products, such as surgical drapes, and the like.

As used herein, the term "absorbent article" refers to a device or product which absorbs and contains body fluids and exudates such as urine. More specifically, this term refers to such devices or articles that are worn against or in proximity to the body of a wearer to absorb and contain various fluids and exudates discharged from the body. The term "disposable" is used herein to describe absorbent articles which are to be discarded after a single use. Such articles are not intended to be laundered or otherwise re-used as an absorbent article. Preferred embodiments of absorbent articles of the present invention are diaper 10 schematically shown in FIGS. 1 and 2, and feminine care pad 11 schematically illustrated in FIG. 3.

Figure 2:
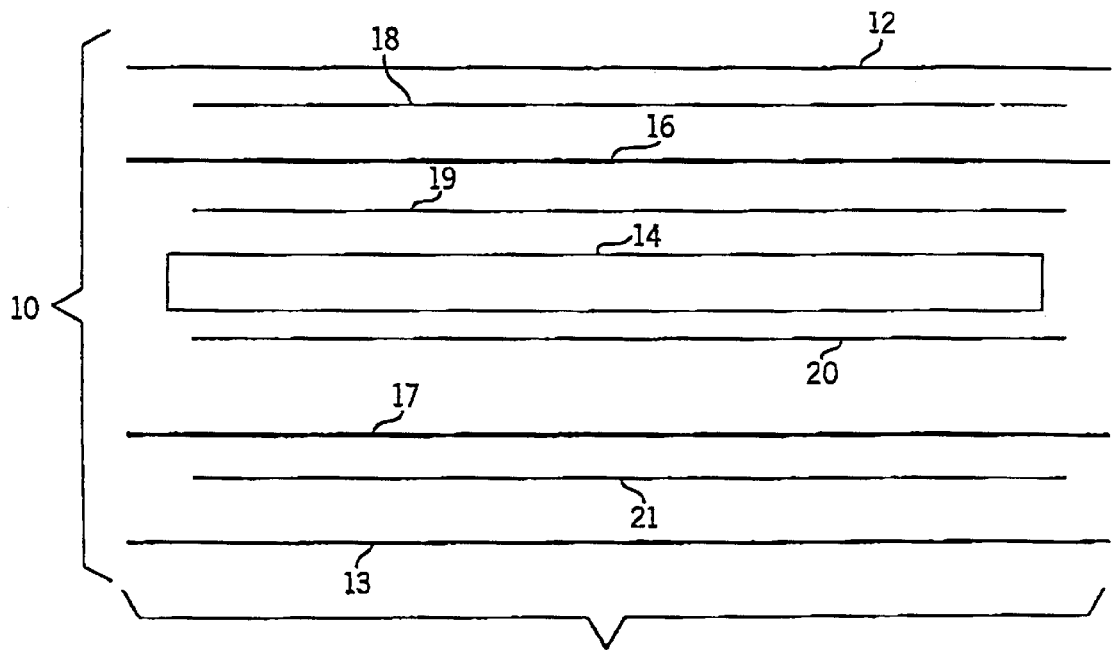
FIG. 2 is a schematic cross-sectional view of the diaper of FIG. 1.

Referring now to FIGS. 1 and 2 there is illustrated in FIG. 1 various substrates comprising diaper 10 in its flat, uncontracted state with portions of the structure being shown schematically to more clearly show the construction of diaper 10. FIG. 2 schematically illustrates in cross section the multiple layers or substrates of diaper 10.

As shown, diaper 10 comprises multiple layers of sheet material or substrates adhesively bonded together to form the absorbent article. More specifically, diaper 10 includes a fluid pervious nonwoven topsheet 12 and a fluid impervious backsheet 13 (typically composed of a polyolefin material such as polyethylene or polypropylene) joined with topsheet 12. An absorbent core 14 is positioned between topsheet 12 and backsheet 13. Absorbent core 14 may be comprised of fluff 8 and, optionally, a centrally disposed superabsorbent polymer (SAP) material 15. Fluff 8 is typically composed of absorbent fibers such as cellulose fibers, but may also include other absorbent natural or synthetic fibers and/or materials. Diaper 10 may also include a top tissue layer 16 disposed between topsheet 12 and core 14 as well as a bottom tissue layer 17 disposed between backsheet 13 and core 14. As shown best in FIG. 2, each substrate can be bonded to an adjacent substrate by a layer of a flexible polyolefin-based adhesive formulated with a flexible polyolefin polymer or blend of said FPO polymers in accordance with the present invention. For example, nonwoven topsheet 12 is bonded to top tissue layer 16 by a layer of adhesive 18 applied to the underside of topsheet 12. In turn, top tissue layer 16 is bonded to core 14 by a layer of adhesive 19. Core 14 is bonded to bottom tissue layer 17 by a layer of adhesive 20 and bottom tissue layer 17 in turn is bonded to a backsheet 13 by a layer of adhesive 21 applied to the upper surface of backsheet 13. The adhesive may be sprayed, spiral sprayed, melt blown, slot applied or may be applied as a bead depending upon the location and the type of bond desired.

As noted above, the absorbent core 14 may contain discrete particles of a superabsorbent material. Superabsorbents are those materials which, upon contact with liquids such as water and body fluids, imbibe and retain such liquids and thereby form hydrogels. In this manner, liquids discharged into the absorbent core 14 can be acquired and held by the particles, thereby providing enhanced absorbent capacity and/or improved liquid retention performance.

The particles of superabsorbent material can be of any desired shape, e.g. spiral or semi-spiral, cubic, rod-like, polyhedral, spherical, etc. Shapes having a large greatest dimension/smallest dimension ratio, such as needles, flakes, and fibers, may also be used herein. Particles also include conglomerates of individual particles. Preferred superabsorbent materials for use in the present invention are "nonfibrous" particles such that the length to diameter ratio of the particulate material is about 10 or less, typically about 1 or less.

The superabsorbent can be an inorganic material such as a silica gel or an organic compound such as a cross-linked polymer. However, superabsorbent will generally comprise a substantially water-insoluble, slightly cross-linked, partially neutralized, hydrogel-forming polymer material. Such absorbent gelling materials can be prepared from unsaturated acid-containing monomers.

Suitable unsaturated acidic monomers for use in preparing the absorbent gelling materials used include those described in U.S. Pat. RE 32,649. Preferred monomers include acrylic acid, methacrylic acid, and 2-acrylamido-2-methyl propane sulfonic acid, with acrylic acid being more preferred. The polymeric component formed from the unsaturated, acid-containing monomers may be grafted onto other types of polymer moieties such as starch or cellulose. Preferred absorbent gelling materials which can be prepared from conventional types of monomers include hydrolyzed acrylonitrile grafted starch, acrylic acid grafted starch, polyacrylates, maleic anhydride copolymers and combinations thereof, with polyacrylates and acrylic acid grafted starch being most preferred.

As shown best in FIG. 1, diaper 10 includes a pair of opposite waist panels 22, 23 interconnecting a crotch portion 24. Crotch portion 24 in turn includes a pair of opposite elasticized leg cuffs 25, 26. The waist panels 22, 23 are held together when diaper 10 is worn by a user by a fastening system which is illustrated in FIG. 1 as a pair of releasable tape tabs 27, 28.

Figure 3:
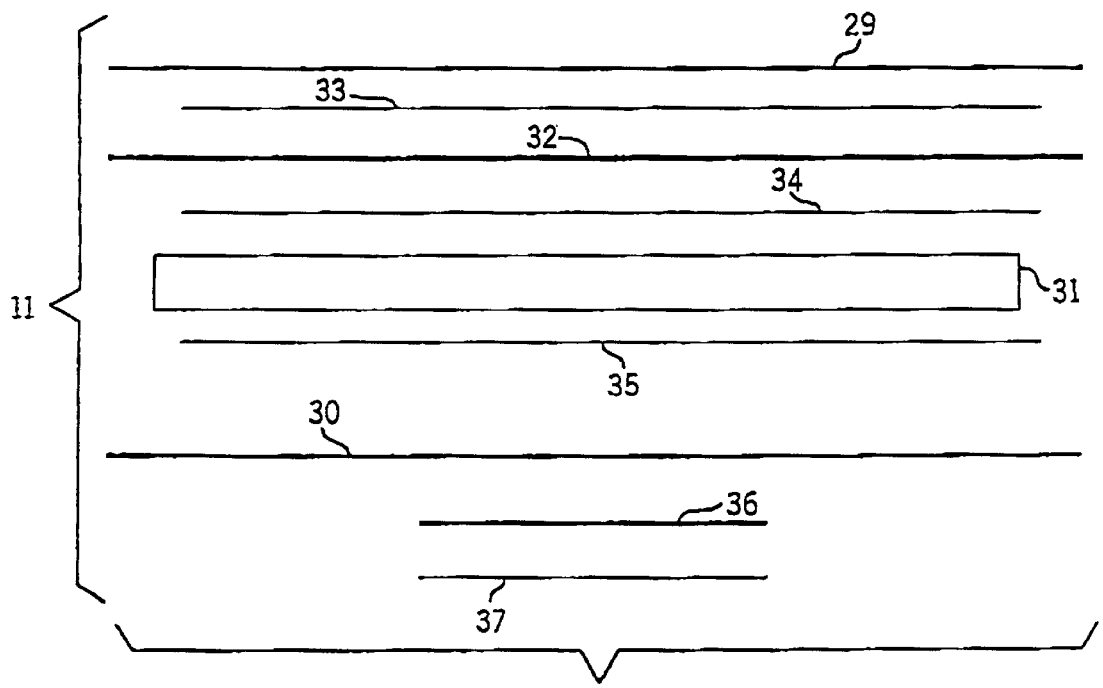
FIG. 3 is a schematic cross-sectional view of a disposable feminine care pad incorporating a hot melt adhesive constructed in accordance with the present invention.

Referring now to FIG. 3, there is illustrated an absorbent article illustrating a typical feminine care pad 11. Pad 11 comprises multiple layers of sheet material or substrates bonded together to form the absorbent article. More particularly, pad 11 includes a fluid pervious nonwoven topsheet 29 and a fluid impervious backsheet 30 (typically composed of a polyolefin material such as polyethylene or polypropylene) joined with topsheet 29. An absorbent core 31 is positioned between topsheet 29 and backsheet 30. Absorbent core 31 may be comprised of fluff and/or super absorbent (SAP) material. Fluff 8 is typically composed of absorbent fibers such as cellulose fibers, but may also include other absorbent natural or synthetic fibers and/or materials. Pad 11 may also include a top tissue layer 32 disposed between topsheet 29 and core 31. As shown in FIG. 3, each substrate is bonded to an adjacent substrate by a layer of an FPO-based adhesive formulated in accordance with the present invention. For example, nonwoven topsheet 29 is bonded to top tissue layer 32 by a layer of adhesive 33 applied to the underside of topsheet 29. In turn, top tissue layer 32 is bonded to core 31 by a layer of adhesive 34. Finally, core 31 is bonded to backsheet 30 by a layer of adhesive 35 applied to the upper surface of backsheet 30. The adhesive may be sprayed, spiral sprayed, melt blown, slot applied or may be applied as a bead depending upon the location and the type of bond desired. In the embodiment illustrated in FIG. 3, there is also a layer of adhesive 36 applied to the bottom side of backsheet 30 and release paper 37 covering adhesive 36. Thus, when paper 37 is removed to expose adhesive 36, adhesive layer 36 may be utilized to attach pad 11 to an undergarment worn by the user, as is conventional and well known in the art.

Figure 4:
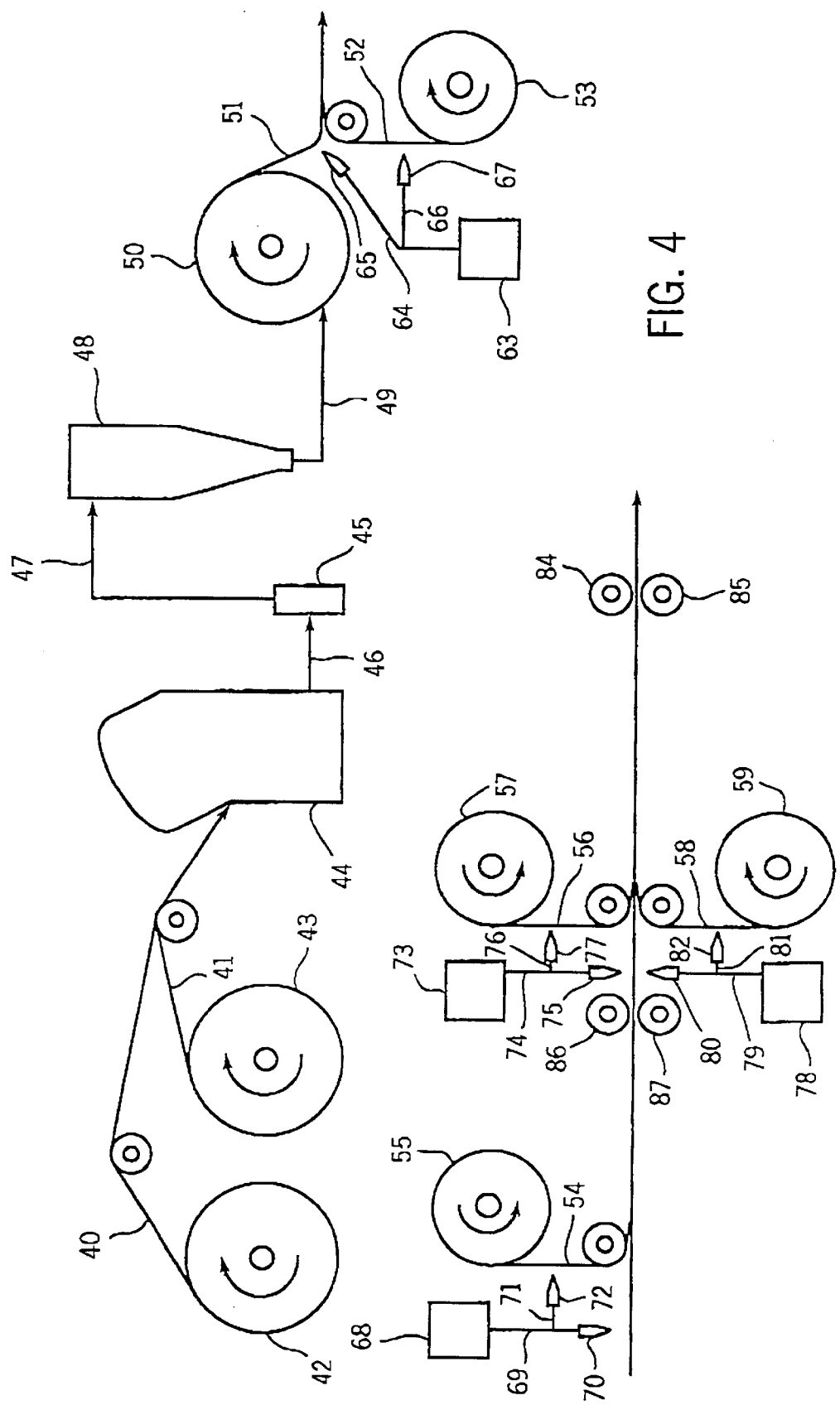
FIG. 4 is a schematic illustration of a system for manufacturing disposable feminine care pads utilizing the hot melt adhesive of the present invention.

Referring now to FIG. 4, there is schematically illustrated a system for manufacturing disposable feminine care pads which embodies the method of the present invention. More specifically, sheets 40 and 41 of absorbent material, typically compacted cellulose fibers, are fed from storage rolls 42 and 43 respectively into a hammermill 44 which shreds the sheets 40 and 41 to form fluff. The fluff is then air conveyed via blower 45 through lines 46 and 47 into a cyclone 48 which homogeneously mixes the fluff with air. The fluff and air mixture is then fed via line 49 to a roll 50 which forms the fluff into an absorbent core. As is conventional, roll 50 includes a screen which has the preformed shape of the core formed therein, and the interior of roll 50 is subjected to a vacuum which draws the fluff from line 49 onto the screen to form the core. As roll 50 rotates, a portion of the interior eventually becomes subject to positive pressure which results in the core being "blown off" the surface of the screen. At this time, the core is substantially non-self-supporting and thus, needs to be supported by a substrate. When making feminine care products such as sanitary napkins, core 51 is supported by a tissue substrate 52 which is fed from storage roll 53. The core 51 supported by tissue layer 52 is then fed downstream where a second tissue layer 54 being fed from drum 55 is applied to the upper surface of core 51. Finally, a nonwoven topsheet 56 fed from roll 57 is applied over tissue layer 54, and an impervious backsheet 58 fed from roll 59 is applied over tissue layer 52 to form the laminated structure illustrated in FIG. 3. The laminated structure is then fed downstream to be further processed into a sanitary napkin. Likewise, if the schematic illustration of the system illustrated in FIG. 4 is utilized to produce diapers, the laminate structure is also fed downstream to be further processed into the diaper illustrated in FIGS. 1 and 2.

The system illustrated in FIG. 4 and described up to this point is conventional and in standard use in the manufacture of feminine care pads and diapers. What is not standard or conventional, however, is the use of FPO-based adhesives in the process described and illustrated in FIG. 4 to bond various components and substrates together. More specifically, in one embodiment, the present method provides a method of bonding the absorbent core to another substrate. In this embodiment, an FPO-based adhesive may be sprayed from a source 63 via line 64 and nozzle 65 onto the bottom surface of core 51. Thereafter, when core 51 is joined with tissue layer 52 and subjected to pressure applied thereto when passing through a nip formed between rolls 86 and 87, the adhesive bonds tissue layer 52 to the interior surface of core 51. Alternately, tissue layer 52 may be bonded to core 51 by spraying the adhesive onto the interior surface of tissue layer 52 via line 66 and nozzle 67. Then, the core 51 and tissue layer 52 may be bonded together as they are subjected to the pressure applied by rolls 86 and 87.

Tissue layer 54 may also be bonded to the top surface of core 51 in a similar manner. As shown in FIG. 4, an FPO-based adhesive from a source 68 may be applied to the top surface of core 51 via line 69 and nozzle 70. Thereafter, tissue layer 54 is applied to core 51 and when subjected to the pressure applied by rolls 86 and 87, the adhesive will result in a strong bond between tissue layer 54 and core 51. Alternately, the same bonding result can be accomplished by spraying adhesive from source 68 via line 71 and nozzle 72 onto the interior surface of tissue layer 54. Once applied, the adhesive will bond tissue layer 54 to the top side of core 51. In either case, the laminate structure is then passed through the nip formed between two calendar rolls 86 and 87 which applies pressure against the laminate structure to ensure strong bonding between the substrates.

Finally, as illustrated, the nonwoven topsheet 56 and the impervious backsheet 58 may also be bonded utilizing FPO-based adhesives. As illustrated, the topsheet 56 may be bonded to tissue layer 54 via adhesive fed from source 73 through line 74 and nozzle 75 onto the outer or top surface of tissue layer 54. Alternately, the adhesive from source 73 may be fed via line 76 and nozzle 77 onto the interior surface of nonwoven layer 56. Likewise, impervious backsheet 58 may be bonded to the underside of tissue layer 52 in a similar manner. FPO-based adhesive from source 78 may be fed via line 79 and nozzle 80 to be sprayed onto the lower surface of tissue layer 52. Alternately, the adhesive may be sprayed via line 81 and nozzle 82 onto the interior surface of backsheet 58.

Once joined into a laminate structure as illustrated in FIG. 3, the core 51, tissue layers 52 and 54, topsheet 56 and backsheet 58 are all subjected to pressure to bond these substrates together. This laminate structure is then passed through the nip formed between two calendar rolls 84 and 85 which applies pressure against the laminate structure to ensure strong bonding between all of the substrates. Thereafter, the laminate structure is fed downstream for further processing into the desired finished article, i.e. a feminine care pad or diaper or the like.

I claim:

1. A hot melt adhesive composition comprising a blend of the following components:
    (a) about 10% to 40% by weight of a polymer, said polymer consisting of a flexible polyolefin polymer or a blend of flexible polyolefin polymers, said flexible polyolefin polymer having a density of 0.86 g/cm$^3$ to 0.90 g/cm$^3$, and a melt flow rate equal to or greater than 5 g/10 min.;
    (b) about 30% to 70% by weight of a tackifying resin;
    (c) about 5% to 30% by weight of a plasticizer;
    (d) about 0% to 30% by weight of a wax; and
    (e) about 0% to 2% by weight of a stabilizer.

2. The composition of claim 1 wherein the flexible polyolefin polymer is a homopolymer of propylene.

3. The composition of claim 1 wherein the flexible polyolefin polymer is a copolymer of propylene with one or more $C_2$ to $C_{10}$ α-olefin monomers, wherein propylene monomer constitutes from 80% to 95% by weight of the copolymer.

4. The composition of claim 3 wherein the flexible polyolefin polymer has a density of about 0.88 g/cm$^3$.

5. The composition of claim 3 wherein the α-olefin is selected from the group consisting of ethylene and butene-1.

6. The composition of claim 1 wherein the tackifying resin is selected from the group consisting of aliphatic and cycloaliphatic hydrocarbon resins and their hydrogenated derivatives, aromatic and hydrogenated aromatic hydrocarbon resins, aromatically modified aliphatic and cycloaliphatic resins and their hydrogenated derivatives, polyterpene and styrenated polyterpene resins.

7. The composition of claim 1 wherein the plasticizer is selected from the group consisting of mineral oil and polybutene.

8. The composition of claim 1 wherein the wax is selected from the group consisting of polyethylene wax having a softening point of from about 65° C. to 120° C., petroleum waxes, synthetic waxes and polyolefin waxes.

9. The composition of claim 1 wherein the adhesive composition further includes a filler in the amount up to 50% by weight.

10. The composition of claim 9 wherein said filler is selected from the group consisting of talc, calcium carbonate, clay, silica, mica, wollastonite, feldspar, aluminum silicate, alumina, hydrated alumina, glass microspheres, ceramic microspheres, thermoplastic microspheres, baryte and wood flour.

11. The composition of claim 1 wherein the adhesive composition further includes an additive selected from the group consisting of a colorant and a fluorescent agent.

12. A method of bonding a first substrate to a second substrate of a disposable nonwoven absorbent article, including the steps of:

feeding a first substrate and a second substrate, said second substrate to be bonded to said first substrate, toward a laminating station;

applying a flexible polyolefin based adhesive to a surface of at least one of said first and second substrates prior to said substrates reaching said laminating station, said adhesive includes as components thereof about 10–40% by weight of a polymer, said polymer consisting of a flexible polyolefin polymer or a blend of flexible polyolefin polymers, said flexible polyolefin polymer having a density of 0.86 g/cm$^3$ to 0.90 g/cm$^3$ and a melt flow index equal to or greater than 5 g/10 min., about 30–70% by weight of a tackifying resin, about 5–30% by weight of a plasticizer, about 0–30% by weight of a wax, and about 0–2% by weight of a stabilizer, the components totaling 100% by weight;

combining said first and second substrates and said adhesive together at said laminating station to form a laminate; and bonding said second substrate to said first substrate.

13. The method of claim 12 wherein said first and second substrates are each independently selected from the group consisting of nonwoven fabric, tissue, absorbent fluff, superabsorbents, elastics, a polyolefin and combinations thereof.

14. The method of claim 13 wherein said polyolefin comprises a polyethylene or polypropylene layer.

15. The method of claim 12 wherein said first substrate is a nonwoven substrate and said second substrate is a tissue substrate.

16. The method of claim 12 wherein said disposable nonwoven absorbent article is a diaper.

17. The method of claim 12 wherein said disposable nonwoven absorbent article is a feminine care pad.

18. The method of claim 12 wherein the step of bonding comprises applying pressure to said laminate.

19. The method of claim 18 wherein the step of applying pressure comprises passing said laminate through a nip formed between a pair of rolls.

20. The method of claim 12 wherein the step of applying said adhesive comprises spiral spraying said adhesive.

21. The method of claim 12 wherein the step of applying said adhesive comprises melt blowing said adhesive.

* * * * *